United States Patent Office 3,654,212
Patented Apr. 4, 1972

3,654,212
PROCESSING AIDS FOR POLYMERS CONTAINING LACTONES
Roy F. Wright, Bartlesville, Okla., assignor to Phillips Petroleum Company
No Drawing. Filed Dec. 10, 1969, Ser. No. 883,987
Int. Cl. C08f 43/00, 45/44
U.S. Cl. 260—32.6 A
10 Claims

ABSTRACT OF THE DISCLOSURE

Polyamines and carbamic acid inner salts of polyamines provide improved processability for polymers containing lactones.

---

This invention relates to a process for improving the processability of lactone-containing polymers. This invention further relates to a new composition of matter composed of a blend comprising a polymer containing lactones and a polyamine or carbamic acid inner salt of a polyamine.

The use of plasticizers and processing aids for plastics and rubbers is well known. Conventional processing aids such as aromatic oils or triethanolamine are exemplary. Processing aids suitable for improving the processability of certain polymers often are of no value for other polymers. In many instances, suitable processing aids for one polymer are deleterious and cause valuable properties such as tensile strength of another polymer to decrease.

A novel class of lactone-containing polymers exhibiting outstanding properties such as green tensile strength has been recently discovered. These polymers, however, have been found to be difficult to process in the conventional rubber or plastics equipment. Conventional processing aids such as aromatic oils and triethanolamine have been found to be unsuitable for these lactone-containing polymers.

It has now been discovered that if a polyamine or carbamic acid inner salt of a polyamine is admixed with these novel lactone-containing polymers the processability of these polymers is greatly enhanced and often there is an increase in tensile strength of the polymer resulting from the admixing of the polyamine or carbamic acid inner salt of the polyamine, according to my invention.

It is therefore an object of this invention to provide a process for improving the processability of lactone-containing polymers. It is a further object of this invention to provide a novel composition comprising a lactone-containing polymer admixed with a polyamine or a carbamic acid inner salt of a polyamine that has improved processing characteristics and often possesses improved tensile strength.

Other objects, features, and advantages of this invention will be apparent to those skilled in the art from the disclosure and discussion herein made known.

According to my invention polyamines or carbamic acid inner salts of polyamines are admixed with a lactone-containing polymers to provide improved processability of said polymer. The compounds of my invention not only provide smoother extrusion surfaces, but they also provide for the employment of lower temperatures and lower pressures in the processing step. By employing the processing aids of my invention, a faster rate of extrusion can often be employed. The compounds of my invention are advantageous in molding the lactone-containing polymers wherein polymer nerve is reduced so that the molded surface of the articles thus prepared are smooth in nature. The processing aids of this invention, when admixed with the lactone-containing polymers, often provide an improvement in the tensile strength of the polymer.

The polyamines that can be employed as the processing aids according to this invention can be represented by one of the following general formulas (1) $R(NR'_2)_x$; wherein $x$ is an integer of from about 2 to 8; wherein R is a polyvalent hydrocarbon radical containing from 2 to 24 carbon atoms whose valence is equal to $x$; and wherein R' can be hydrogen or an alkyl aryl, cycloalkyl hydrocarbon radical or combinations thereof such as cycloalkylaryl, containing from 1 to 12 carbon atoms; or (2)

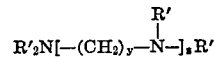

wherein $y$ is an integer from 1 to 4; $z$ is an integer from 1 to 7 and wherein R' has the same meaning as hereinbefore described. It is preferred that the compounds employed according to this invention contain from about 2 to 24 carbon atoms per molecule.

Exemplary of suitable compounds corresponding to the above formulas are:

ethylenediamine;
tetraethylenepentamine;
heptaethyleneoctamine;
1,2,4-benzenetriamine;
1,3,5,7,9-cyclododecanepentamine;
1,4,5,6-anthracenetetramine;
1,3,5,7,9,11,13,15-tetracosaneoctamine;
1-N,N-diheptylamino-4-aminonaphthalene;
bis-1,4-N-heptylaminobenzene;
bis-1,10-N-cyclopentylaminoanthracene;
N,N'-diphenyl-1,4-diaminobutane;
N-phenyl-N'-benzyl-1,6-diaminohexane;
N-cyclopentyl-N'-benzyl-1,4-diaminonaphthalene and the like.

The carbamic inner salts of polyamines that can be employed according to this invention can be represented by the general formula YHN— R''—X; wherein R'' is an acyclic alkylene radical containing from about 4 to 15 carbon atoms; Y is one or two hydrogen atoms, an alkyl or aryl radical containing from about 1 to 6 carbon atoms; and X is a carbamic radical such as the carbamic radical per se (—NHCOO—) or a carbamic radical wherein one of the oxygen atoms is bonded to a hydrogen atom as in a N-carboxamino radical (—NHCOOH). Examples of suitable compounds of the above type include the carbamic acid inner salts of the following polyamines: tetraethylene pentamine; hexamethylenediamine; triethylenetetramine; diethylenetriamine; pentamethylenediamine; decamethylenediamine; pentadecamethylenediamine; N-phenylhexamethylene diamine; N-methylbutylenediamine; heptamethylenediamine; and the like.

The carbamic acid inner salt of the polyamine can be prepared according to any known process in the art such as by reacting the corresponding polyamine with carbon dioxide under anhydrous conditions. The polyamine is often preferably dissolved in a solvent before reacting it with carbon dioxide. Suitable solvents of the polyamine are organic solvents such as para-xylene, benzene, methanol and ethanol. The reaction temperature usually varies between about 20° C. and 100° C. depending upon the solvent employed. The volume of solvent to weight of polyamine generally varies between about 8:1 and about 50:1. An excess of carbon dioxide of at least 1:2 to 1:5 polyamine to carbon dioxide is usually employed in the reaction.

The amounts of polyamines or carbamic acid inner salts of polyamines employed as processing aids for the lactone-containing polymers is in the range from about 0.5 to 7.5 parts by weight per 100 parts by weight of the lactone-containing polymers, preferably from about 1 to 3 parts by weight of processing aid per 100 parts by weight of the lactone-containing block polymer.

The processing aids of this invention can be added to the polymers on a roll mill or in an internal mixer such as a Banbury mixer or any of the conventional polymer mixing equipment. When these compounds are added to the polymer on a roll mill, it is preferred that the polymer is first milled until it bands to the rolls and then the processing aids of this invention are added and the milling is continued until the mixing is complete. When employed with an internal mixer, the processing aids of this invention can be added at any time during the mixing cycle. Any method of blending the processing aids of this invention with the polymer can be employed provided that complete mixing is obtained.

The temperatures at which the processing aids in the polymer are admixed can vary over a wide range. Generally, the temperature employed is from about 180° to 350° F. The particular temperature employed will generally be determined by two factors: (1) the temperature should be high enough for the polymer to band on the roll mill, if employed, and (2) if the carbamic acid inner salts of the polyamines are employed the mixing temperature should be at least high enough to decompose the carbamic acid inner salt to give carbon dioxide and the polyamine. The time required in mixing these processing aids with the lactone-containing polymers is not critical but should be at least sufficient to achieve uniform mixing.

If desired, the polymers containing the processing aids of this invention can be extended with conventional extender oils and can also contain fillers such as clay, silica, carbon black and the like. Pigments can be added to provide for the formulation of colored articles. The polymers of this invention can be employed in the manufacture of cove base, shoe soles, stair tread, floor tile, and the like.

The lactone-containing polymers that are employed according to this invention are copolymers comprising a base polymer and contain from about 1 to about 99 weight percent of one or more lactones based upon the total weight of the monomers used to make the copolymer. The base polymer can be a rubbery homopolymer of a conjugated diene containing about 4 to 12 carbon atoms per molecule, a homopolymer of a monovinyl-substituted aromatic compound containing about 8 to 20 carbon atoms per molecule, or a rubbery or resinous copolymer of a conjugated diene and a monovinyl-substituted aromatic compound which copolymer can contain any proportion of the monovinyl-substituted aromatic compound. Accordingly, the lactone or lactones used to make up the lactone polymer portion will be present in the final copolymer in an amount from about 1 to about 99 weight percent based upon the total weight of all of the monomers employed in the preparation of the lactone-containing copolymer. In the above description it can be seen that the base polymer can comprise from about 1 to about 99 weight percent of the final copolymer based upon the total weight of the final product copolymer, the remainder being substantially the lactone polymer portion.

The particular process employed for preparing the lactone-containing polymer employed according to this invention is not critical. A preferred process for preparing block copolymers containing from about 1 to 99 weight percent lactone polymer is described in U.S. Patent application Ser. No. 883,986, by Floyd E. Naylor, filed on even date with this application, entitled Lactone Copolymers, now United States Letters Patent 3,598,799 issued Aug. 10, 1971. Said application is hereby incorporated into my disclosure by reference thereto. Lactones suitable for use according to this invention can be represented by the following general formula:

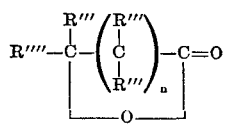

wherein R'''' is one of hydrogen and a radical of the formula

and when R'''' is a radical as specified no R''' is attached to the carbon atom to which the radical is attached, wherein R''' is one of hydrogen, alkyl, cycloalkyl, and aryl and combinations thereof such as alkylaryl, wherein the total carbon atoms in the R''' and R'''' substituents being in the range of 1 to 12, and wherein $n$ being an integer which can be 1,3, or 4. Exemplary lactones are epsilon-caprolactone, beta-propiolactone and the like.

Further objects and advantages of this invention will become evident to those skilled in the art from the foregoing discussion and the following examples and claims. The following examples are illustrative of this invention but it should be understood that various materials used and the amounts employed are illustrations of the preferred embodiments of this invention and that these examples should not be construed to unduly limit the scope of this invention.

EXAMPLE

Two processing aids of this invention, i.e. tetraethylenepentamine (TEPA) and hexamethylenediamine carbamate (HMDAC) were compared with Philrich 5*, a highly aromatic oil, and triethanolamine (TEA) as processing aids for a styrene/butadiene/ε-caprolactone (20/20/60) block polymer. In addition, hexamethylenediamine carbamate was employed as a processing aid for butadiene/styrene (60/40) branched block copolymer for comparative purposes.

The lactone-containing polymer was prepared according to the following polymerization recipe:

Polymerization recipe

| Step 1: | Parts, by weight |
|---|---|
| Cyclohexane | 468 |
| Styrene | 20 |
| sec.-Butyllithium | 0.173 |
| Time, hours | 1 |
| Temperature, ° F. | 158 |
| Conversion, percent | 100 |
| Step 2: | |
| 1,3-butadiene | 20 |
| Time, hours | 1.5 |
| Temperature, ° F. | 158 |
| Conversion, percent (total) | 100 |
| Step 3: | |
| Ethylene oxide | 0.352 |
| Cyclohexane | 312 |
| epsilon-Caprolactone [1] | 60 |
| Time, hours | 21.5 |
| Temperature, ° F. | 158 |
| Conversion, percent (total) | 97 |

[1] Distilled from tolylene-2,4-diisocyanate.

In the preparation of the lactone-containing polymer, cyclohexane was charged to the reactor first, then was heated to 158° F. Styrene was added next followed by the sec-butyllithium. After a one-hour reaction period, during which the styrene was essentially completely polymerized, butadiene was added and polymerized essentially completely during a 1.5-hour reaction period. Ethylene oxide (10 percent by weight in cyclohexane) was added to the reaction mixture and allowed to react for three minutes before additional cyclohexane was added, and finally, the ε-caprolactone was added. After a 21.5-hour reaction period, the mixture was discharged into another vessel and stirred for 10 minutes with a solution of 2,2'-methylene-bis(4-methyl-6-tert-butylphenol) in isopropyl alcohol in order to provide, in the recovered polymer, about 1.5 parts by weight of the antioxidant per 100 parts by weight of the polymer. The polymer was separated and dried at 130° F.

*Trademark.

The control polymer, i.e. the branched block copolymer was prepared according to the following polymerization recipe.

Polymerization recipe

Step 1: Parts, by weight
- Cyclohexane _____ 800
- Styrene _____ 40
- sec.-Butyllithium _____ 0.13
- Tetrahydrofuran (THF) _____ 1.5

Step 2:
- 1,3-Butadiene _____ 60

Step 3:
- Epoxol 9–5 [a] _____ 0.5
- Temperature, °F. _____ 126–170
- Time, hours (total) _____ 1.9
- Conversion, percent _____ 100

[a] Product of Swift and Company. A polyepoxidized vegetable oil having a viscosity at 25° C. of 8.8 poises, a specific gravity of 1.020, an epoxy content of 9.0 percent (oxirane oxygen, saponification number of 176 (maximum), and a Gardner color less than 1. Averages over 5 epoxy groups per molecule.

In the above polymerization recipe the cyclohexane containing the tetrahydrofuran was charged to the reactor first followed by the styrene and the sec.-butyllithium. The polymerization was initiated at 126° F. and allowed to proceed adiabatically. After the styrene was essentially completely polymerized, the butadiene was added and polymerized. The coupling agent, Epoxol 9–5, was then added. The polymer was stabilized with 0.5 part by weight of 2,6-di-tert-butyl-4-methylphenol and 1.5 parts by weight of tri(nonylphenyl)phosphite containing one percent triisopropanolamine, both expressed in terms of 100 parts by weight of polymer. The stabilized polymer was recovered by the steam stripping of the polymer solution and the separated polymer was then dried in an extruder-expeller.

In the following runs observations were made during the milling of the polymers on a 2-inch diameter roll mill at a setting of 0.070 inch. In each run, the processing agent, if added, was mixed with the polymer at 330° F. The polymer was then milled at the various temperatures indicated and observations recorded. After milling at one temperature the polymer was removed from the mill until the temperature desired from the next test had been established. After milling in the presence of the processing aids, the Mooney viscosity of some of the polymers was measured. Samples of the polymers were then molded under pressure at 300° F. and the tensile strength, elongation, and modulus of the molded specimens measured. The results of the runs are reported in Tables I and II. The results of the milling observations as reported in Table I reveal that the conventional processing aids, Philrich 5* and TEA, were ineffective in producing a tight rolling continuous band of polymer whereas the compounds of this invention remarkably improved the milling of the lactone-containing polymers even at greatly reduced temperatures. Use of the compounds of this invention at the lower levels of concentration actually gave an improvement in stress-strain properties as demonstrated in Run 6. The TEA at the lower level (Run 7) had only a slight effect on these properties while still not improving the processability of the polymer.

Table II effectively demonstrates that the processing aids of this invention are particularly suited for employment with lactone-containing polymers according to this invention and that the HMDAC was ineffective in improving the processing of the butadiene/styrene branched block copolymer and also appeared to decrease the stress-strain properties thereof.

As will be evident to those skilled in the art, various modifications of this invention can be made or followed, in light of the disclosure and discussion herein set forth without departing from the scope and spirit thereof.

*Trademark.

TABLE I

| Run Number | Recipe, parts by weight | | | | | | |
|---|---|---|---|---|---|---|---|
|  | 1 | 2 | 3 | 4 | 5 | 6 | 7 |
| Styrene/butadiene/-caprolactone block copolymer (20/20/60) | 100 | 100 | 100 | 100 | 100 | 100 | 100 |
| HMDAC | 5 |  |  |  |  | 1.5 |  |
| Philrich 5 [1] |  | 5 |  |  |  |  |  |
| TEPA |  |  | 5 |  |  |  |  |
| TEA |  |  |  |  | 5 |  | 1.5 |

| | Results—milling observations—band/bank [a] | | | | | | |
|---|---|---|---|---|---|---|---|
| Temperature, °F.: | | | | | | | |
| 150 | LT-F |  | N-N |  |  |  |  |
| 160 | TR-C | N-N | TR-C |  |  | N-N | TR-C | N-N |
| 180 | TR-C |  |  |  |  | N-N |  |
| 200 | TR-C | N-N | TR-C |  | N-N |  | TR-C |  |
| 220 | TR-C |  |  | N-N | N-N | N-N |  |
| 240 |  | TR-L |  | TR-L | TR-L |  | TR-L |

| | Properties of molded specimens | | | | | | |
|---|---|---|---|---|---|---|---|
| 300% Modulus, p.s.i.[b] |  | 1,280 |  |  | 1,400 | 1,070 | 1,020 |
| Tensile, p.s.i.[b] | 650 | 1,550 | 800 | 960 | 1,770 | 2,340 | 1,790 |
| Elongation, percent [b] | 100 | 380 | 100 | 260 | 420 | 640 | 65 |

| | Mooney viscosity [c] | | | | | | |
|---|---|---|---|---|---|---|---|
| ML-4, temperature 240° F | 4 | 68 | 4 | 4 | (²) | [3] 72 | [3] 28 |

[1] Trademark.
[2] Too high to measure.
[3] MS-4 at 280° F.
[a] LT=loose on top; F=folding; TR=tkgnt rolling; C=continuous; N-no band or bank; L=lacy.
[b] Determined according to ASTM-D-412-66.
[c] Determined according to ASTM-D-1646-63.

TABLE II

| | Recipe, parts by weight | |
|---|---|---|
| | Run 1 | Run 2 |
| Butadiene/styrene (60/40) branched block copolymer | 100 | 100 |
| HMDAC | 5 | |
| | Results-Milling Observations-Band/Bank [a] | |
| Temperature, 240° F | N-N | N-N |
| | Properties of molded specimen | |
| 300% modulus, p.s.i. [b] | 370 | 420 |
| Tensile, p.s.i. [b] | 3,040 | 3,450 |
| Elongation, percent [b] | 850 | 870 |
| | Mooney viscosity [c] | |
| | 71 | 82 |

[a] As in Table I.
[b] As in Table I.
[c] As in Table I, MS-4 at 280° F.

I claim:

1. A process for improving the processability of a lactone-containing polymer comprising admixing with said polymer a processing aid comprising a polyamine or a carbamic acid inner salt of a polyamine, wherein said processing aid is employed to provide from about 0.5 to 7.5 parts by weight per 100 parts by weight of said polymer;
wherein said polyamine can be represented by:

(1)         $R(NR'_2)_x$ wherein $x$ is an integer of from 2 to 8, R is a polyvalent hydrocarbon radical containing 2 to 24 carbon atoms whose valence is equal to $x$, and each R' is hydrogen or alkyl, aryl, cycloalkyl hydrocarbon radical, or combination thereof, containing from 1 to 12 carbon atoms;

or by (2) 

wherein $y$ is an integer from 1 to 4, and $z$ is an integer from 1 to 7;
said carbamic acid inner salt can be represented by

YHN—R''—X wherein R'' is an acyclic alkylene radical containing from 4 to 15 carbon atoms, Y is one or two hydrogen atoms, an alkyl radical containing up to 6 carbon atoms, or an aryl radical, and X is a carbamic radical per se or carbamic radical wherein one of the oxygen atoms is bonded to a hydrogen atom;
and wherein said lactone-containing polymer is a block copolymer comprising a polymer prepared from about 1 to 99 weight percent of at least one lactone based upon the total weight of monomers used to make said copolymer, and from about 99 to 1 weight percent of conjugated diene containing from about 4 to 12 carbon atoms per molecule, monovinyl-substituted aromatic compound containing from about 8 to 20 carbon atoms per molecule, or combination thereof, wherein said admixing of said processing aid with said lactone-containing polymer is conducted under conditions sufficient to achieve substantially complete mixing and at a temperature sufficient to substantially decompose said carbamic acid inner salt when used.

2. The process of claim 3 wherein said processing aid is employed to provide from about 1 to 3 parts by weight per 100 parts by weight of said polymer and wherein said admixing is conducted within the temperature range of about 180° to 350° F.

3. The process of claim 1 wherein said at least one lactone can be represented by the formula:

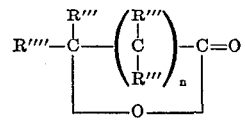

wherein R'''' is one of hydrogen and a radical of the formula:

and when R'''' is a radical as specified no R''' is attached to the carbon atom to which the radical is attached, R''' is one of hydrogen, alkyl, cycloalkyl, and aryl and combinations thereof, the total carbon atoms in the R''' and R'''' substituents being in the range of about 1 to 12, and $n$ is an integer and is 1, 3, or 4.

4. The process of claim 3 wherein said conjugated diene is butadiene; said monovinyl-substituted aromatic compound is styrene and said lactone is epsilon-caprolactone.

5. The process of claim 3 wherein said processing aid is tetraethylenepentamine or hexamethylenediamine carbamate.

6. A composition comprising a lactone-containing polymer admixed with a polyamine or carbamic acid inner salt of a polyamine wherein said polyamine or said carbamic acid inner salt of a polyamine is employed from bout 0.5 to 7.5 parts by weight per 100 parts by weight of said polymer;
wherein said polyamine can be represented by:

(1)         $R(NR'_2)_x$ wherein $x$ is an integer of from 2 to 8, R is a polyvalent hydrocarbon radical containing 2 to 24 carbon atoms whose valence is equal to $x$, and R' is hydrogen or alkyl, aryl, cycloalkyl hydrocarbon radical, or combinations thereof, containing from 1 to 12 carbon atoms;
or by (2) 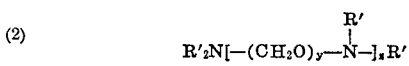

wherein $y$ is an integer from 1 to 4, and $z$ is an integer from 1 to 7;
said carbamic acid inner salt can be represented by

YHN—R''—X wherein R'' is an acyclic alkylene radical containing from 4 to 15 carbon atoms; Y is one or two hydrogen atoms, an alkyl radical containing up to 6 carbon atoms, or an aryl radical; and X is a carbamic radical per se or carbamic radical wherein one of the oxygen atoms is bonded to a hydrogen atom;
and wherein said lactone-containing polymer is a copolymer comprising at least one polymer block prepared from about 1 to 99 weight percent of at least one lactone based upon the total weight of monomers used to make said copolymer, and at least one polymer block prepared from about 99 to 1 weight percent of conjugated diene containing from about 4 to 12 carbon atoms per molecule, monovinyl-substituted aromatic compounds containing from about 8 to 20 carbon atoms per molecule, or combination thereof.

7. The composition of claim 6 wherein said polyamine or said carbamic acid inner salt of the polyamine is employed to provide from about 1 to 3 parts by weight per 100 parts by weight of said polymer.

8. The composition of claim 6 wherein said at least one lactone can be represented by the formula:

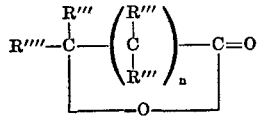

wherein R'''' is one of hydrogen and a radical of the formula:

and when R'''' is a radical as specified no R''' is attached to the carbon atom to which the radical is attached, wherein R''' is one of hydrogen, alkyl, cycloalkyl, and aryl and combinations thereof, wherein the total carbon atoms in the R''' and R'''' substituents being in the range of about 1 to 12, and wherein $n$ being an integer which can be 1, 3, or 4.

9. The composition according to claim 7 wherein said conjugated diene is butadiene; said monovinyl-substituted aromatic compound is styrene and said lactone is ε-caprolactone.

10. The composition of claim 7 wherein said polyamine or said carbamic acid inner salt of a polyamine is tetraethylenepentamine or hexamethylenediamine carbamate.

References Cited

UNITED STATES PATENTS

| | | | |
|---|---|---|---|
| 3,442,870 | 5/1969 | Lohse et al. | 260—32.6 |
| 3,489,819 | 1/1970 | Busler | 260—78.3 |

ALLAN LIEBERMAN, Primary Examiner

U.S. Cl. X.R.

260—879